United States Patent

[11] 3,619,176

[72] Inventors Robert G. Briody;
 Ephraim A. Cuevas, both of Corpus Christi, Tex.
[21] Appl. No. 860,239
[22] Filed Sept. 23, 1969
[45] Patented Nov. 9, 1971
[73] Assignee PPG Industries, Inc.
 Pittsburgh, Pa.

[54] ALUMINUM AMALGAM PREPARATION
 9 Claims, 1 Drawing Fig.
[52] U.S. Cl. .................................................. 75/68 R,
 75/81, 75/138, 209/50, 252/463
[51] Int. Cl. ............................................. C22b 21/00
[50] Field of Search .......................................... 75/68 R,
 81, 138

[56] References Cited
UNITED STATES PATENTS
3,102,805 9/1963 Messner ....................... 75/68 R
OTHER REFERENCES
Hansen, Constitution of Binary Alloys, 2d Ed. McGraw-Hill Book Co. 1958, pp. 99,100

Primary Examiner—L. Dewayne Rutledge
Assistant Examiner—J. Davis
Attorney—Chisholm and Spencer ABSTRACT: A method of preparing aluminum amalgam or aluminum-mercury mixtures is described in which mercury vapors are passed through a bed of aluminum particles contained in a chamber. The particles are removed from the chamber after thorough contact with the mercury and washed in an inert, organic, oxygen-free liquid to remove excess mercury. The particles are described as useful as a catalyst in the manufacture of tetramethyl lead.

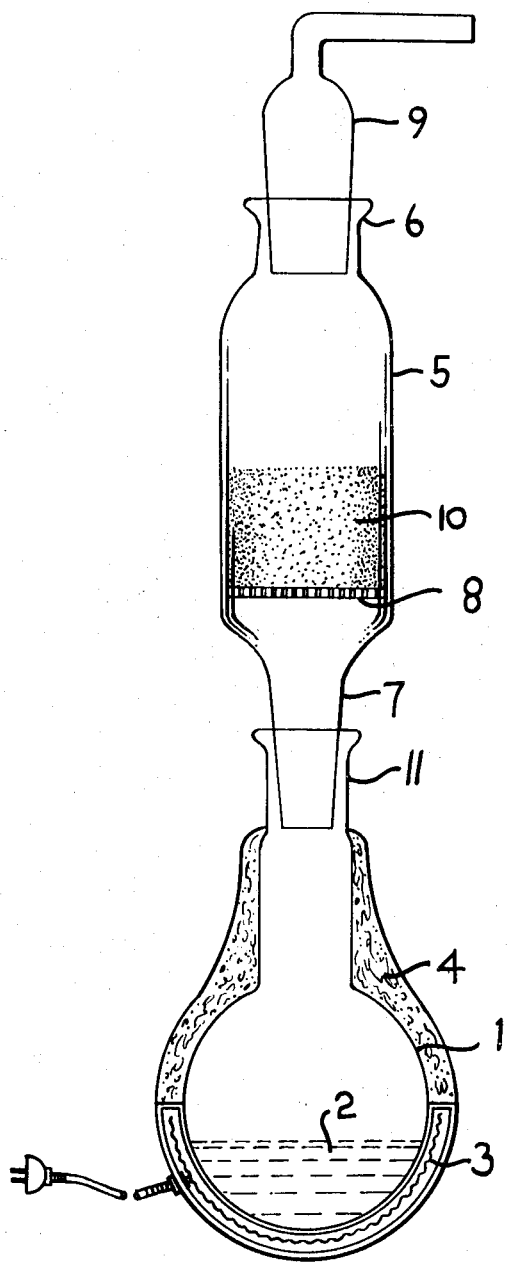

ALUMINUM AMALGAM PREPARATION

BACKGROUND OF THE INVENTION

It has been discovered that mixtures of aluminum and mercury, presumably as aluminum amalgams, but possibly as aluminum-mercury mixtures, may be utilized successfully as a catalyst in the preparation of tetramethyl lead from alkyl halides and sodium lead alloy. Thus, in a copending application of Ronald S. Bartlett, U.S. Ser. No. 860,311, filed on the same date as this application a process is described in which tetramethyl lead is produced in good yield utilizing an aluminum-mercury catalyst. The preparation of aluminum-mercury mixtures or aluminum amalgams has been attempted by tumbling mixtures of aluminum and mercury in mixing bottles, by rotating aluminum powders in rotating drums in contact with mercury and other like physical mixing procedures. Serious difficulties were encountered utilizing these physical mixing methods in that the aluminum-mercury mixtures or aluminum amalgams obtained were nonhomogeneous in that they possessed varying quantities of mercury. Uniformity of product was not capable of being obtained. Since it was desirable to provide an aluminum-mercury catalyst composition of more or less uniform composition for utilization in a chemical reaction for the production of tetramethyl lead, none of the above methods were considered satisfactory for the production of the desired aluminum-mercury mixtures or aluminum amalgams.

THE PRESENT INVENTION

In accordance with the instant invention, a method of preparing aluminum amalgam or aluminum-mercury mixture has been discovered which involves passing vapors of mercury through a bed of aluminum particles and thoroughly contacting the aluminum particles contained in the bed with the metallic mercury as it passes through the bed of particles. The aluminum-mercury mixture obtained is then preferably washed with an inert liquid, typically an organic liquid, and importantly devoid of free oxygen, that is, oxygen in the elemental state, to thereby remove excess mercury from the surface of the aluminum-mercury particles and produce a uniform aluminum-mercury mixture or aluminum amalgam. The aluminum-mercury particles recovered from the washing step are preferably kept in storage in an inert atmosphere for utilization as catalyst for the production of tetramethyl lead.

The particular size of aluminum particles utilized in the preparation of aluminum amalgams or mixtures of aluminum-mercury in accordance with the instant invention can vary considerably depending upon the ultimate use. Where the particles are being designed specifically for utilization as a catalyst material for the preparation of tetramethyl lead, it is preferable that the particle size be as uniform as possible. Control of the aluminum particle size distribution results in an aluminum amalgam or aluminum-mercury mixture which is more or less uniform in size. Typically, in the synthesis of tetramethyl lead utilizing aluminum-mercury mixtures or aluminum amalgam of the instant invention as a catalyst, particles ranging in size from 6 to 325 mesh can be conveniently prepared, typically 10 to 170 mesh. The particle size is of no particular moment in the preparation of the mixtures or amalgams using the process of the instant invention except that where uniformity of particle size of the final product is desired, it is determined in great measure by the uniformity of the aluminum powder or particles which are contacted with the mercury vapors. Thus, where close control of the particle size distribution of the final amalgam or mixture is desired, aluminum particles should be carefully screened to provide as little variation as possible in the particle size distribution of the aluminum particles. Typically where a particle size range of say 10 to 30 mesh aluminum amalgam is desired as the final product, aluminum particles approximating the 10 to 30 mesh size range are employed and the mercury vapors are contacted with these particles to provide an aluminum-mercury mixture or aluminum amalgam within this desired particle size range.

In depositing the mercury on the aluminum particles, the particles may conveniently be placed in a chamber to form a bed through which mercury vapors can be freely passed. This procedure provides for mercury vapor contact with each individual aluminum particle contained in the bed in order to afford adequate opportunity for these vapors to react with the particles to form the amalgam or physically bond therewith to form a mixture of aluminum and mercury. Preferably the contact of mercury vapors with the aluminum particles is accomplished by passing the mercury vapors vertically through a bed of aluminum particles contained in a reaction zone positioned above a mercury source, for example, a pool of mercury suitably heated to provide for vaporization of the mercury. Mercury vapors are supplied constantly from the source, passed up through the bed of particles to insure thorough and complete contact of the mercury vapors with aluminum particles. When thorough and complete contact has been established, the supply of mercury vapors is discontinued. After the admission of the mercury vapors to the bed is stopped, the excess mercury is drained from the bed of particles. The aluminum amalgam or aluminum-mercury particles are then contacted with an inert, preferably organic liquid, to remove excess mercury therefrom. The mercury content of the aluminum amalgam prepared in accordance with this invention is typically between 0.2 to 30 percent by weight. Preferably, for catalytic work a mercury content of between 0.2 to 3 percent by weight is typical in the aluminum amalgam prepared.

In the washing step care should be taken to ensure the absence of elemental oxygen in the washing liquid. For this reason a de-oxygenated organic material, such as methanol, hexane and the like, is used in accomplishing the desired result. The desired result, with respect to the production of the aluminum-mercury mixtures or amalgams is of course the production of homogeneous particles. Homogeneity with respect to size of particles is readily accomplished by regulating the particle size of the aluminum particles with which the mercury vapors have been contacted. Homogeneity with respect to the mercury content of the aluminum particles is accomplished by regulating the time of contact of the mercury vapors with the aluminum particles and ensuring, after contact with mercury vapor for a particular period of time, that all excess mercury is removed by adequate washing and in the absence of oxygen. Oxygen, if present in the inert washing liquids, can result in some oxidation of the catalyst particles prepared and thus lead to nonuniformity or nonhomogeneity of the particles. In catalyst work this is an undesirable quality and one which is avoided by recourse to the teachings of the instant invention. Preferably, washing liquids used are de-oxygenated hydrocarbons but other organic liquids can be used. Thus, typical of the washing liquids which may be employed are methanol, hexanol, benzene, kerosene, hexane, propanol and mixtures thereof.

For a more complete understanding of the instant invention, reference is made to the accompanying drawing which shows laboratory apparatus utilized to prepare the aluminum amalgams or aluminum-mercury mixtures of the instant invention.

As shown in the Figure, a pool of mercury 2 is located in the bottom of a flask 1, which is surrounded in its lower half by an electric heating mantle 3. The flask is insulated on the upper portion of the bottom with glass wool 4 to a point slightly below the neck of the flask. The reaction vessel 5 is fitted with a fritted glass disc 8 and a bed of aluminum particles 10 placed on the fritted glass disc. The reaction chamber 5 is provided with a tapered end 7 open at the bottom and a neck member 6. The tapered end section 7 is inserted in the neck of the flask 1. A glass elution tube 9 is placed in the upper neck 6 of reaction vessel 5 and is connected to a vacuum pump and cold trap (not shown).

In the operation of the above device, the heating mantle is plugged into an appropriate socket and heated to a temperature sufficient to cause vaporization of the mercury 2 contained in the bottom of flask 1. As the mercury evaporates, it passes up through the fritted glass disc 8 and the bed 10 of aluminum particles contained in the reaction vessel 5. Excess mercury vapors are removed via line 9 to the cold trap and are collected at that point. When a sufficient period of time has passed to produce saturation of the aluminum powders contained in the bed 10, the heating mantle is disconnected. The aluminum powders are then removed, washed with methanol and the aluminum amalgam analyzed for mercury content.

The following example illustrates the process of the instant invention as applied to a specific quantity of aluminum.

EXAMPLE 1

Fifty grams of aluminum powder was placed on the fritted glass disc of a reactor such as that depicted in the drawing. Reactor vessel 5 consisted of a 5-inch high glass reactor. A 250 milliliter round bottom flask containing a pool of mercury about half full was connected to the reaction vessel. At the top of the reactor, tube 9 led to a trap connected to a vacuum pump. The pump was maintaining 674 millimeters of mercury continuous vacuum on the reaction system. The mercury was heated in the bottom of the flask until it refluxed at temperature of approximately 250° C. The mercury vapors rose through the bed of particles and condensed above the aluminum powder. After 12 hours of constant vaporization of the mercury, the reactor was cooled and three samples of the powder were removed in a nitrogen atmosphere for analysis of the mercury content. After the analyses of the particles was completed, the remainder of the sample was recombined and slurried with methanol in a separatory funnel. This allowed the removal of any free liquid mercury which collected at the bottom. The powder was then filtered, dried and reanalyzed in duplicate. A second batch of aluminum powder was treated in the same equipment and at about 155° C. and with a vacuum of 649 millimeters of mercury maintained on the reaction zone for 12 hours. The free mercury was removed this time using a benzene slurry, after which the powder was filtered and dried. Separate mercury analyses were made on riffled portions of the powder. A portion of the product was examined through a microscope and compared with the starting material. All handling and sampling of the powders before and after treatment with the mercury was done in a nitrogen atmosphere.

Results of the analyses made on the aluminum powders above showed the analysis of the first preparation using the mercury vapor ranging from 7.7 percent to 13.6 percent mercury.

Duplicate analysis after the excess mercury was removed using the methanol slurry in the separatory funnel showed 0.27 percent and 0.27 percent mercury, respectively.

The second preparation, after the free mercury was removed by washing with the benzene solution, was found to contain 2.17 percent and 2.18 percent mercury in two analyses performed 2 days apart. No mercury droplets were observed during the microscopic examination of the product. No differences were observed in the appearance, size or shape between the starting aluminum powder and the product.

The following example illustrates the use of catalyst prepared as above described in the preparation of tetramethyl lead.

EXAMPLE 2

A stainless steel autoclave was used to conduct a series of experiments using aluminum-mercury catalyst prepared in the manner described in example 1. The aluminum-mercury powder used in all experiments contained 2.17 percent mercury by weight. In each of the experiments the autoclave was charged with 0.2 mole NaPb alloy screened to −¼-inch +40 mesh, between 1.07 and 1.35 moles of methyl chloride and 4 mole percent of aluminum basis the lead used as aluminum-mercury powder. Various reaction times and temperatures were employed in the experiments and the tetramethyl lead yield was determined by gas chromatograph and by an ethylenediaminetetraacetic acid titration method. The results of these experiments are shown below in table I.

TABLE I

Synthesis of TML Using Al-Hg Powder Catalyst

| Run | Temp. °C. | Time (Hrs) | Sodium Reacted (%) | TML Yield (% basis Na charged) By GC | By EDTA |
|---|---|---|---|---|---|
| 1 | 100 | 4 | 88.9 | 74.5 | 76.8 |
| 2 | 100 | 85.5 | | 68.8 | 66.7 |
| 3 | 100 | 2 | 85.4 | 74.5 | 71.8 |
| 4 | 110 | 4 | 92.1 | 76.0 | 80.5 |
| 5 | 110 | 3 | 92.2 | 71.9 | 71.8 |
| 6 | 110 | 3 | 93.1 | 77.3 | 77.8 |
| 7 | 110 | 3 | 87.8 | 80.5 | 76.8 |
| 8 | 110 | 2 | 78.4 | 68.7 | 72.1 |
| 9 | 120 | 4 | 95.5 | 76.0 | 81.7 |
| 10 | 120 | 3 | 91.3 | 72.4 | 76.4 |
| 11 | 120 | 2 | 93.1 | 75.4 | 78.5 |

As can be readily seen from table I, the use of the aluminum-mercury powder produced a favorable yield of tetramethyl lead.

The procedure of the instant invention as will be readily appreciated by the skilled artisan, provides for aluminum-mercury mixtures or amalgams of varying concentration. The concentration and reactivity of the aluminum and mercury can be enhanced by the quantity of heat supplied to the reaction system. Change in the particle size of the aluminum, the length of time the mercury vapors contact the aluminum particles and other similar variables affect the final catalyst composition. Thus, where a higher concentration of mercury is required, contact times of longer duration, higher bed temperatures, and other similar procedures may be utilized to raise the mercury concentration of the final mixture. Where smaller concentrations of mercury are looked for, short contact times, small particles of aluminum and mild temperatures are desirable.

The two important considerations in accomplishing the ends of the instant invention are the passage of mercury vapors in intimate contact with the aluminum particles and the washing of the final product with an inert organic liquid free of elemental oxygen to ensure that the final catalyst particles are homogeneous and free of droplets of mercury. While a specific method of passing mercury vapors through a bed of particles has been shown in the above examples, it will be understood that many alternative methods may be employed for feeding mercury through a bed of aluminum particles. Indeed aluminum particles can be dropped free-falling through a chamber containing mercury vapors and from which the particles may be removed continuously. The particles can thus be showered with an inert organic solvent to provide aluminum amalgam particles which can be transferred to a storage chamber maintained oxygen free. Similarly while the mercury vapors have been shown passed in a vertical direction through a bed of particles, it is obvious that mercury vapors can be passed down through beds of particles or in a horizontal direction. The important consideration in the practice of the invention is to provide intimate contact of mercury vapors with each of the aluminum particles contained in the bed.

We claim:
1. A method of preparing an aluminum amalgam comprising passing vapors of mercury through a bed of aluminum par- ticles, contacting the aluminum particles after passage of the mercury therethrough with an inert liquid devoid of free oxygen to remove excess mercury from the aluminum particles and recovering after said contact aluminum amalgam particles.

2. A method of preparing an aluminum amalgam comprising passing vapors of mercury through a bed of aluminum particles thereby contacting the mercury vapors with the particles contained in the bed, discontinuing the passage of the mercury through the bed after the particles have been thoroughly wetted, removing excess droplets of mercury from the bed by contacting the bed of particles with an inert liquid devoid of elemental oxygen to thereby remove excess mercury from the bed of particles and recovering from the bed aluminum containing mercury particles free of droplets of mercury.

3. A method of preparing aluminum amalgam comprising establishing a bed of aluminum particles of predetermined size, passing vapors of mercury through said bed of aluminum particles for a period of time sufficient to contact the particles of aluminum contained in the bed with mercury vapors, continuing the passage of mercury vapors until condensation of mercury occurs in the reaction vessel, removing excess mercury from the aluminum particles contained in the bed by washing the particles with an inert liquid devoid of elemental oxygen and recovering aluminum amalgam particles from said bed after the washing step.

4. The method of claim 3 wherein the excess mercury is removed with an inert, organic liquid containing no free oxygen.

5. The method of claim 4 wherein the liquid is hexane.

6. The method of claim 4 wherein the liquid is methanol.

7. The method of claim 4 wherein the liquid is benzene.

8. A method of preparing aluminum amalgam comprising passing vapors of mercury in contact with loosely packed aluminum particles to thereby provide contact of the vapors of mercury with the aluminum particles contained in the bed, discontinuing the passage of mercury through the bed after all aluminum particles have been substantially contacted therewith, contacting the resulting particles with an inert organic liquid free of elemental oxygen consisting of the member of the group consisting of benzene, hexane, methanol, ethanol, propanol, toluene and mixtures thereof to remove excess mercury from the aluminum amalgam particles contained therein and recovering after said contact the aluminum amalgam particles containing no free mercury droplets.

9. An aluminum amalgam containing between 0.2 to 30 percent by weight mercury and having a particle size range of between 6 and 325 mesh.

* * * * *